(12) United States Patent
Oba et al.

(10) Patent No.: US 8,786,880 B2
(45) Date of Patent: Jul. 22, 2014

(54) DEVICE AGENT FOR DISTRIBUTED PROCESSING AND PRINTING

(75) Inventors: Kazutaka Oba, Johns Creek, GA (US); Tomoki Hattori, Suwanee, GA (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 731 days.

(21) Appl. No.: 13/040,702

(22) Filed: Mar. 4, 2011

(65) Prior Publication Data
US 2012/0224217 A1    Sep. 6, 2012

(51) Int. Cl.
*G06F 15/00* (2006.01)

(52) U.S. Cl.
USPC ............. 358/1.15; 358/1.1; 358/1.4; 358/1.9; 358/1.13; 358/518

(58) Field of Classification Search
USPC ............................. 358/1.1, 1.4, 1.9, 1.13, 518
See application file for complete search history.

(56) References Cited

U.S. PATENT DOCUMENTS

| | | | | |
|---|---|---|---|---|
| 5,333,246 A | * | 7/1994 | Nagasaka | 345/619 |
| 2006/0100724 A1 | * | 5/2006 | Miura et al. | 700/82 |
| 2007/0127060 A1 | * | 6/2007 | Matsuo | 358/1.15 |
| 2008/0225332 A1 | * | 9/2008 | Saito | 358/1.15 |
| 2010/0322661 A1 | * | 12/2010 | Yamamichi | 399/75 |

FOREIGN PATENT DOCUMENTS

| | | | | |
|---|---|---|---|---|
| JP | 2005208824 A | * | 8/2005 | |
| JP | 2006171991 A | * | 6/2006 | |

* cited by examiner

*Primary Examiner* — Allen H Nguyen
(74) *Attorney, Agent, or Firm* — Oblon, Spivak, McClelland, Maier & Neustadt, L.L.P.

(57) ABSTRACT

Systems and algorithmic processes directed to first and second image processing devices connected to a network for distributed processing/printing. The first device receives a print job from a user device, and divides the print job into a plurality of portions of the print job which require image processing prior to printing. These portions are then transmitted to a number of the second devices which are compatible with distributed processing/printing and which are in an idle status mode. The second devices process the portions by, for example, rasterizing the portions, and then transmit the rasterized portions back to the first device. The first device assembles the rasterized portions into an assembled print job which is ready for printing. The first device prints the assembled print job or transmits the assembled print job to another networked device for printing, facsimile transmission, email transmission or storage.

18 Claims, 10 Drawing Sheets

Fig. 4A

*Printer Score Window*     _ ☐ ✕

| | |
|---|---|
| Printer: | Device 300 ▽ |
| IP Address: | 192.168.10.101 |
| CPU: | 1 GHz Single Core |
| Memory: | 256 MB 266 MHz |
| Network I/F: | 100 Mbits/s |
| Idle Time: | 1000 minutes/day |
| Power Cost: | $1.00/kWh |

Score: 500

[ Adjust Calculations ]

Fig. 4B

*Printer Score Window*     _ ☐ ✕

| | |
|---|---|
| Printer: | Device 300 ▽ |
| IP Address: | 192.168.10.102 |
| CPU: | 500 MHz Single Core |
| Memory: | 512 MB 266 MHz |
| Network I/F: | 1000 Mbits/s |
| Idle Time: | 800 minutes/day |
| Power Cost: | $1.60/kWh |

Score: 550

[ Adjust Calculations ]

| Print Window | _ □ X |
|---|---|

Printer Name: [Device 200 ▽]　　[Properties]
Status: Idle　　　　　　　　　　　[Add Printer]
Type: Ricoh Aficio SP 4110N-KP
Location: Room 1000
Comments: Networked Printer Pages to Print: [All ▽]　　Pages/Sheet: [1 ▽]
Copies: [1 ⇕]　　　　　　Scaling: [No ▽]
Collate: [Yes ▽]　　　　　　[Other Options]

*Print Destination*

Printer Name: [Device 200 ▽]　　[Properties]
Status: Idle　　　　　　　　　　　[Add Printer]
Type: Ricoh Aficio SP 4110N-KP　[Default]
Location: Room 1000
Comments: Networked Printer

[Distributed Printing Properties]

*Fig. 7*

DEVICE AGENT FOR DISTRIBUTED PROCESSING AND PRINTING

BACKGROUND

1. Field of the Disclosure

This disclosure is related to distributed computing, specifically distributed processing and printing for networked image processing apparatuses including image forming apparatuses.

2. Description of the Related Art

Printers and multifunction printers receive print jobs from user devices such as personal computers. In an office environment, a number of printers or multifunction printers may be provided, and a user can select one for printing by way of a common network connection. When not in use, these devices can be set to a standby, sleep or hibernating mode, which are low-power operational settings of the device.

These printers and multifunction printers can be referred to as image processing apparatuses (IPAs), and can include a variety of image forming apparatuses (IFAs) and document processing devices. Examples include printers, scanners, copiers and facsimile machines of varying capabilities. Any number of these devices can be in a standby, sleep or hibernating mode when not in active use by a user.

SUMMARY

The inventors have discovered various inefficiencies with such networks of IFAs. Many of these devices include computing hardware similar to that found in personal computers. In particular, IFAs include high-speed central processing units (CPUs), a large amount of memory (such as high-speed random access memory or hard disk storage) and high-speed network adapters configured for use with high-speed Ethernet networks, such as Gigabit Ethernet.

While idle (i.e. hibernating, sleeping, or otherwise in an energy saving standby mode/state), the devices are not being actively used by a user. Specifically, taking a printer as an example, the printer is not processing a print job or performing image forming onto a paper medium. Taking a facsimile machine as an example, the facsimile machine is not transmitting or receiving a facsimile or performing printing. Thus, the hardware resources of the device are not being engaged for any sort of processing directed to the device's primary function of printing or faxing, for example.

In aspects of this disclosure, the otherwise idle hardware components of these devices are used for distributed image processing for distributed printing. Other aspects of this disclosure include distributed computing, grid computing, clustering and distributed network storage.

Further aspects of this disclosure are directed to discovering network devices compatible with distributed processing for distributed printing and identifying available resources for distributed processing and distributed printing. Preferred embodiments of these aspects include dynamically and self-actively updating a list of available resources for distributed processing and printing, including discovery of neighboring devices and the creation of self-network groups.

A first aspect of this disclosure is directed to processes, algorithms, computer-readable mediums, systems and apparatuses concerning a first image processing device. The first device receives a print job from a user device, divides the print job into a plurality of divided jobs, and transmits the divided jobs to a plurality of second network image processing devices. The divided jobs represent portions of the print job received by the first device. These portions are respectively processed by the second devices, and the first device then receives the processed portions (divided jobs) from the second devices, and assembles the received portions into an assembled print job.

Preferably, prior to transmitting the portions (the divided jobs), the first device generates an agent list of devices among the second devices which are compatible with receiving a portion of the print job and transmitting the portion, after processing the portion, back to the first device. The generating of an agent list preferably includes querying the connected network for second devices, building a list of second devices, and accessing each of the second devices. In accessing the second devices, a determination is made as to whether the second device includes an agent compatible with receiving the above noted portions, processing the same, and transmitting the processed portion back to the first device. An agent list is built by adding second devices thereto which include the compatible agent.

In a further embodiment, if the second device does not include the agent, then the agent is transmitted to the second device from the first device and installed thereon. However, it should be appreciated that the agent does not need to originate from the first device, but can originate from an Internet resource or a user device connected to the network. Nonetheless, by having the agent installed on the second device, the second device can be added to the agent list. In this aspect, the transmission of the divided jobs includes transmitting the jobs only to second devices identified in the agent list—that is, only to second devices including the agent.

In these and other aspects, each of the portions of the print job (each of the divided jobs) is a different/unique portion of the print job that requires image processing prior to printing. The required processing is preferably a rasterizing processing, but can include other imaging processes the devices are capable of performing, including formatting documents/images for printing, document/image scaling and formatting concerning a user selection of a number of pages per sheet.

In preferred aspects, the processing referred to herein is a processing directed to receiving an input format from a user device (such as a computer), such as a document, and processing the input format into an output format required by a printer for forming an image of that document onto a medium. However, it should be appreciated other types of processing can be envisioned by those skilled in the art as falling within the scope of this disclosure.

After assembling the processed portions into an assembled print job by the first device, the first device prints the assembled print job. Alternatively, the first device transmits the assembled print job to another networked device for printing, storage or facsimile transmission. However, other destinations directed to other functions of the devices should be readily appreciated by those skilled in the art, including email machines/servers.

Since it is preferred to use network resources that are idle, the first device preferably transmits an idle status request to the second device requesting the operational status thereof. Upon receipt of an operational status indicating the second device is idle, the first device then transmits portions of the print job only to those second devices having the idle status. Since the second devices are idle, it may be necessary to transmit, with the portions of the print job or the transmission of the idle status request, a command to the second devices to return the second devices from a standby or hibernating status so that the hardware of the second devices is prepared to receive and process portions of the print job.

Additionally, is some preferred aspects, the transmitting of the portions to the plurality of second devices includes selecting second devices (to transmit to) according to calculated capability scores of a larger pool of second devices. Each capability score indicates a relative performance level of a particular second device, and is calculated based on a combination of that particular second device's functional hardware, idle time and power consumption cost. Thus, in one aspect, only efficient second devices are selected (where the efficiency is a combination of time and cost factors based on power and processing factors of the second device).

A second aspect of this disclosure relates to processes, algorithms, computer-readable mediums, systems and apparatuses directed to a second image processing device connected to a first image processing device through a network. The second device receives a portion of a print job (a division of the print job) from the first device and processes the portion. The second device then transmits the processed portion back to the first device.

Preferably, the second device receives an agent query from the first device. The agent query is for determining whether the second device is compatible with receiving the portion of the print job, processing the portion, and transmitting the processed portion back to the first device. The second device transmits a compatibility acknowledgment back to the first device that the agent is installed in the second device.

When the agent query is transmitted to the second device and either (1) the second device transmits a compatibility acknowledgement to the first device that the agent is not installed in the second device or (2) the second device does not transmit a compatibility acknowledgement within a predetermined amount of time, the second device receives or acquires the agent for installation. After installing the agent, the second device transmits the compatibility acknowledgement back to the first device, indicating that the agent is installed in the second device so that the second device can be added to an agent list of the first device. The second device receives the agent for installation from the first device, a user device or an Internet resource.

Preferably, the second device receives an idle status request requesting an operational status of the second device, and the second device transmits a current status thereof to the first device. Here, the second device transmits an idle status, such as a standby or sleep status, as the current status. In response thereto, the second device receives a portion or portions of the print job. That is, the second device receives the portion(s) only when the second device transmits the idle status, and thus, only when the second device is in the idle status. If the second device includes operational states such as a sleep or hibernating mode, then the idle status request from the first device can include a wake-up command so that the second device returns to an operational-ready state, although the second device is still be idle.

In accordance with the above-introduced aspects of this disclosure, the first and second devices include printers, copiers, scanners, facsimile machines, network storage devices and multifunction printing apparatuses.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 4A and 4B illustrate calculation windows for calculating a device score;

FIG. 7 illustrates a configuration window for configuring a print job with distributed printing;

DETAILED DESCRIPTION

Figure 1:
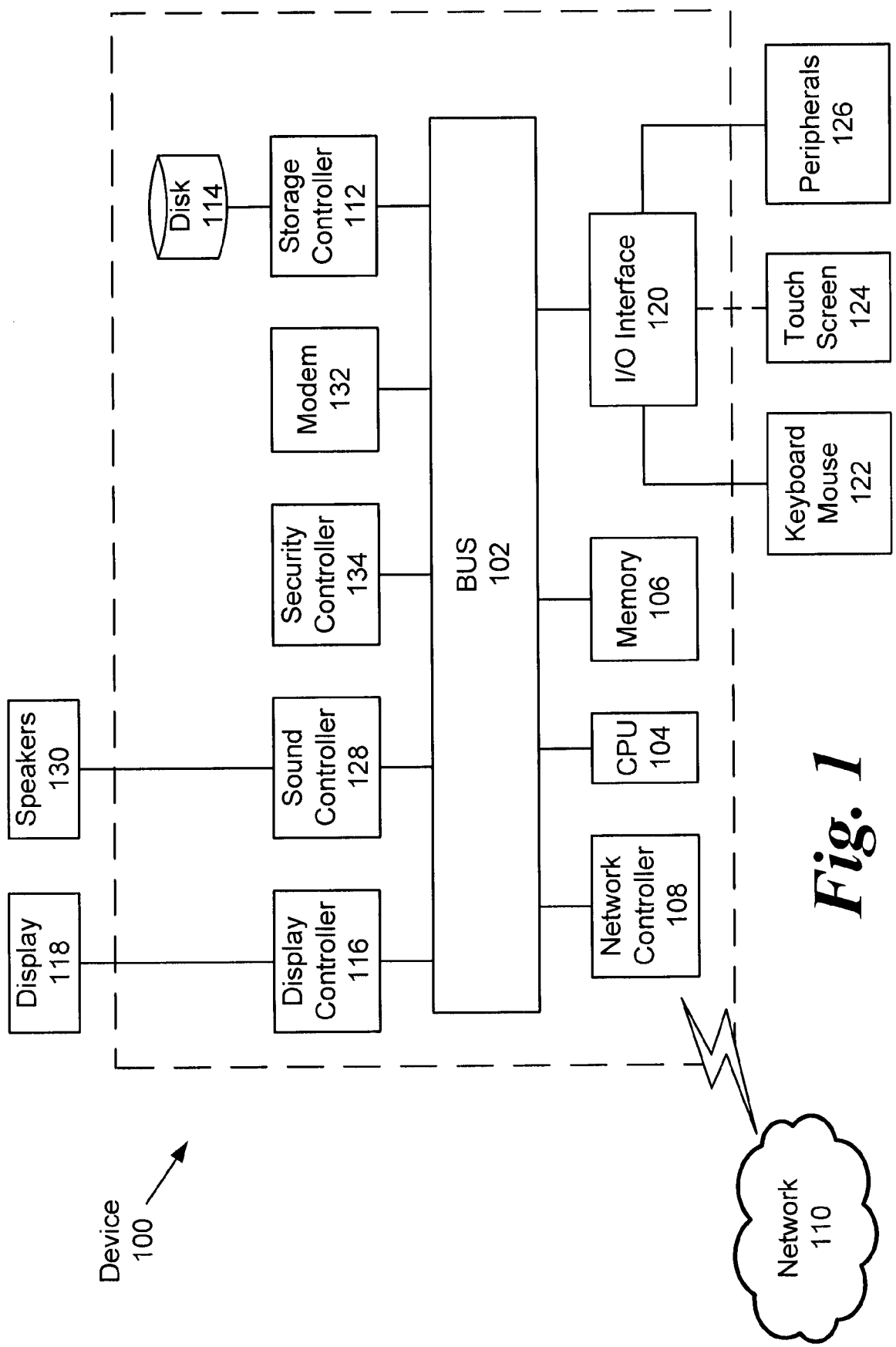
FIG. 1 is a block diagram showing the functional hardware components of preferred implementations of a user device.

The disclosure will now refer to the drawings, wherein like reference numerals designate identical or corresponding parts throughout the several views. It should be appreciated the drawings merely embody exemplary and preferred aspects of this disclosure.

Figure 2:
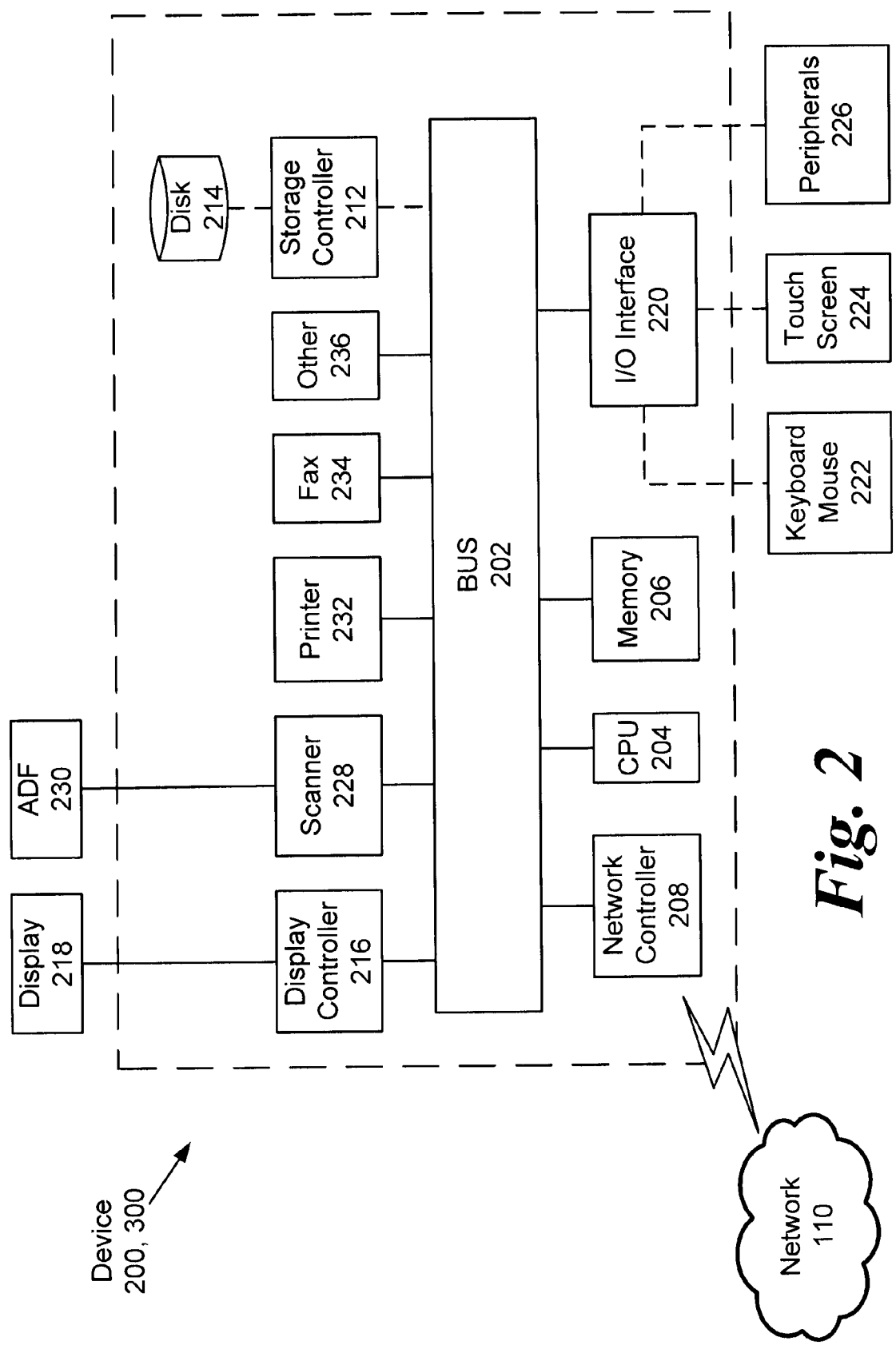
FIG. 2 is a block diagram showing the functional hardware components of preferred implementations of image processing devices.

FIG. 1 shows an exemplary structure of a user device 100, while FIG. 2 shows an exemplary structure of image processing devices 200 and 300. Generally, these systems include computer hardware components that are either individually programmed or execute program code stored on various recording medium, including memory, hard disk drives or optical disk drives. In some aspects, these devices include application specific integrated controllers and other additional hardware components.

In an exemplary aspect, the user device 100 is a personal computer. The user device 100 includes a central BUS 102, to which a central processing unit (CPU) 104, memory 106 and a network controller 108 are connected. The network controller 108 controls communication via a network 110 by way of Ethernet cabling or Wi-Fi according to IEEE 802.3 and/or 802.11, for example.

The user device 100 preferably includes a storage controller 112 for controlling a disk unit 114, such as a hard disk drive, an optical disk drive or another high-capacity storage system. The user device 100 has a display controller 116, such as a graphics processing unit, connected to a display 118 which is usually an external and removable component.

Further, the user device 100 includes an input/output interface 120 connected to the BUS 102 for allowing user interface. Connected thereto is preferably a keyboard/mouse 122. However, other interfaces such as a touch screen 124 (generally coupled together with the display 118) can be provided. Additionally, other peripherals 126 can be included.

A sound controller 128 is also generally connected to the BUS 102 for processing audio data, which is then converted to a signal for output by speakers 130. Also, in preferred aspects, security measures are taken within the device 100 by way of a security controller 134. The security controller 134 provides encryption processes for storing encrypted data on the disk 114 or transmitting encrypted data via the network controller 108 onto the network 110. In some aspects, the security controller 134 includes a fingerprint reader or other biometric scanning device to authenticate a user of the user device 100.

A particular implementation according to this disclosure utilizes a user device 100 embodied as a personal computer loaded with a Microsoft operating system, such as Windows 7. However, it should be appreciated by one of ordinary skill in the art that various operating systems can be used without deviating from the scope of the claimed invention.

The image processing devices 200 and 300, shown in FIG. 2, preferably have similar components to those of the user device 100, but further include image processing components, including image forming hardware and/or finishing hardware.

In particular, the devices 200 and 300 include a central BUS 202, to which a central processing unit (CPU) 204, memory 206 and a network controller 208 are connected. The network controller 208 controls communication via a network 110 by way of Ethernet cabling or Wi-Fi according to IEEE 802.3 and/or 802.11, for example.

The devices 200 and 300 optionally include a storage controller 212 for controlling a disk unit 214, such as a hard disk drive, an optical disk drive or another high-capacity storage system. Also optionally, the devices 200 and 300 include a display controller 216, such as a graphics processing unit, connected to a display 218 which is usually an external and removable component. A sound system, although not shown, can also be provided including an audio processor, amplifier and speakers.

Further, the devices 200 and 300 include an input/output interface 220 connected to the BUS 202 for allowing user interface. Connected thereto is preferably a keyboard/mouse (or a keypad) 222. However, other interfaces such as a touch screen 224 (generally coupled together with the display 218) can be provided. Additionally, other peripherals 226 can be included.

The devices 200 and 300 preferably include at least one of a scanner 228 (with or without an automated document feeder—ADF), a printer 232 and a facsimile machine 234. However, it should appreciated the devices 200 and 300, in some aspects, include all of these components in addition to other components 236. Other components 236 include finishing components and specialized image processors. In one aspect, an image processing device 200 or 300 according to this disclosure includes application specific processors for image processing, including rasterizers (e.g., a raster image processor—RIP). A RIP is used to generate an image for printing by generating a bitmap of the image.

For brevity, the devices 200 and 300 will be referred to as image processing devices, with the implication that they include various image processing and/or forming components. Examples include laser printers such as the Ricoh Aficio SP 4110N-KP, facsimile machines such as the Ricoh FAX5510NF, multifunction apparatuses such as the Ricoh Aficio MP C4500 EFI and scanners such as the Ricoh IS760D, each of which are provided by Ricoh Americas Corporation of West Caldwell, N.J. However, other comparable devices should be readily envisioned by one skilled in the art.

Exemplary printers include laser printers, but may also include thermal and inkjet printers, and exemplary finishing components include stamps, staplers, punches, binders and duplexers. However, it should be appreciated that one skilled in the art can appreciate other functional components consistent with this disclosure.

The user device 100 and the image processing devices 200 and 300 communicate via a network. Preferred employments of this disclosure include the user device 100 connecting to a local area network (LAN), which is a geographically-restricted type of network including devices connected through networking devices by Ethernet cabling and Wi-Fi according to IEEE 802.3 and/or 802.11, for example. However, it should be appreciated that the user device 100 is capable of communicating with the image processing devices 200 and 300 via an Internet connection (preferably routed through the LAN), via an Internet connection to establish a virtual LAN connection, or direct connections including a USB (universal serial bus) connector, a serial port connector or a parallel port connector.

Although not shown, the LAN includes various networking devices such as routers, switches and hubs. In a preferred aspect, one networking device is configured to assign internet protocol (IP) addresses for each of the user device 100 and the image processing devices 200 and 300. These IP addresses can be managed automatically by a dynamic host configuration protocol (DHCP) or statically through a host computer. Preferred implementations include a DHCP server which manages IP addresses semi-dynamically, as is discussed below.

The following descriptions refer to IP addresses with reference to IPv4 addresses, which refers to a 32 bit address assigned to a particular device. IPv4 is generally sufficient for LANs. However, it should be appreciated that IPv6 addresses are well within the scope of this disclosure. That is, instead of the 32 bit addresses discussed below, this disclosure is inclusive of implementations having 128 bit addresses pursuant with IPv6, or other IP address schemes.

In preferred aspects, IP addresses are assigned to a particular device by a networking device (such as a DHCP servier) upon connection of that device to the network. In other aspects, IP addresses are predetermined for each device and recorded in a database managed by a networking device or through a networked computer such as a server. IP address management generally includes storing information uniquely identifying devices, such as a media access control (MAC) address, together with the IP address assigned to the device. Maintaining the same IP addresses for a device is beneficial in some aspects because the network location of that particular device is maintained and other devices can communicate with the static device without regularly searching for the static device.

Preferably, a DHCP server is used to assign IP addresses dynamically, which means an IP address is assigned to the device each time the device connects to the network, which can include each time the device returns from a standby/sleep mode or turns on. However, dynamic addressing schemes can be problematic because device searching may need to be regularly performed so devices know the locations of each other. Accordingly, since dynamic addressing schemes can cause difficulties in efficiently locating a particular networked device, it is preferred the DHCP server dynamically assigns static network (i.e. IP) addresses. It is further preferred the DHCP server is specifically configured to always assign the same network address to a particular device on the network so the need for the devices on the network to regularly search for one another is reduced.

Figure 3A:
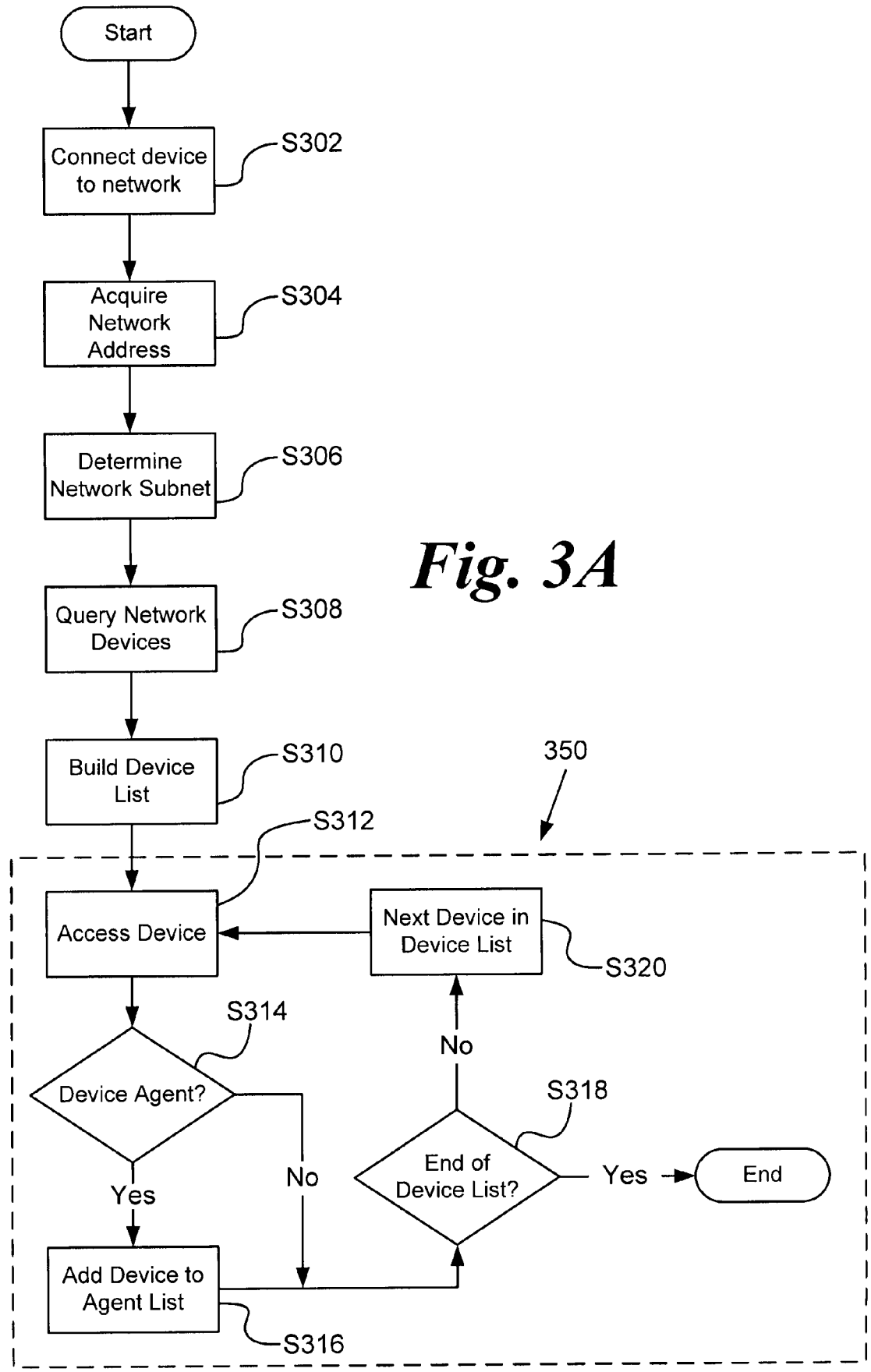
FIG. 3A is an algorithmic flowchart showing the building of a list of devices having a device agent.

Reference will now be made to FIG. 3A, which shows an algorithmic procedure of a device connecting to a network, such as a device 200 or 300. For simplicity, the device 200 will be referred to as a source device, whereas the devices 300 will be referred to as destination devices. FIG. 3A refers generally to the device 200 connecting to a network, but it should be appreciated that any of the devices 300 can follow similar procedures.

The device 200 is connected to a network at S302, such as a LAN as discussed above. The device 200 then acquires a network address at S304, such as an IPv4 address from a DHCP server. Upon receipt of the network address, the device 200 determines a network subnet at S306. In an example where the network address assigned to the device 200 is an IP address of 192.168.10.100, the subnet of the device 200 has an IP range from 192.168.10.1 to 192.168.10.255. However, it should be appreciated that various other subnets can be defined, especially in light of IPv6, without detracting from the scope of this disclosure.

The device 200 will then query network devices within the above-noted subnet range at S308. In particular, the device 200 will start accessing each accessible network address of a port of the network devices within the above-noted subnet. Preferably, the device 200 attempts to access each of the network devices by using a port associated with printing (or a port associated with networked image processing and forming apparatuses).

In this respect, the device 200 utilizes transmission control protocol (TCP) port 9100 to query network devices with a page description language (PDL). PDL is a language describing the appearance of a printed page. However, other languages can be used (on other ports if appropriate) without detracting from the scope of this disclosure. In particular, printer job language (PJL) can be used to communicate between the devices 100, 200 and 300. In these aspects, the device 200 thus builds a device list of networked image processing apparatuses (i.e. the devices 300) at S310.

The following portion of the algorithm shown in FIG. 3A refers to the process identified as a process block 350 and includes S312 through S320. The process block 350 describes a process of accessing the devices in the device list at S312 and determining whether the device includes a device agent at S314. If so, the device is added to an agent list at S316. Otherwise, a determination is made at S318 as to whether an end of the device list is reached. If not, then a next device is chosen at S320 and that next device is accessed at S312. By repeating this procedure for each device in the device list, a comprehensive agent list is compiled.

Figure 3B:
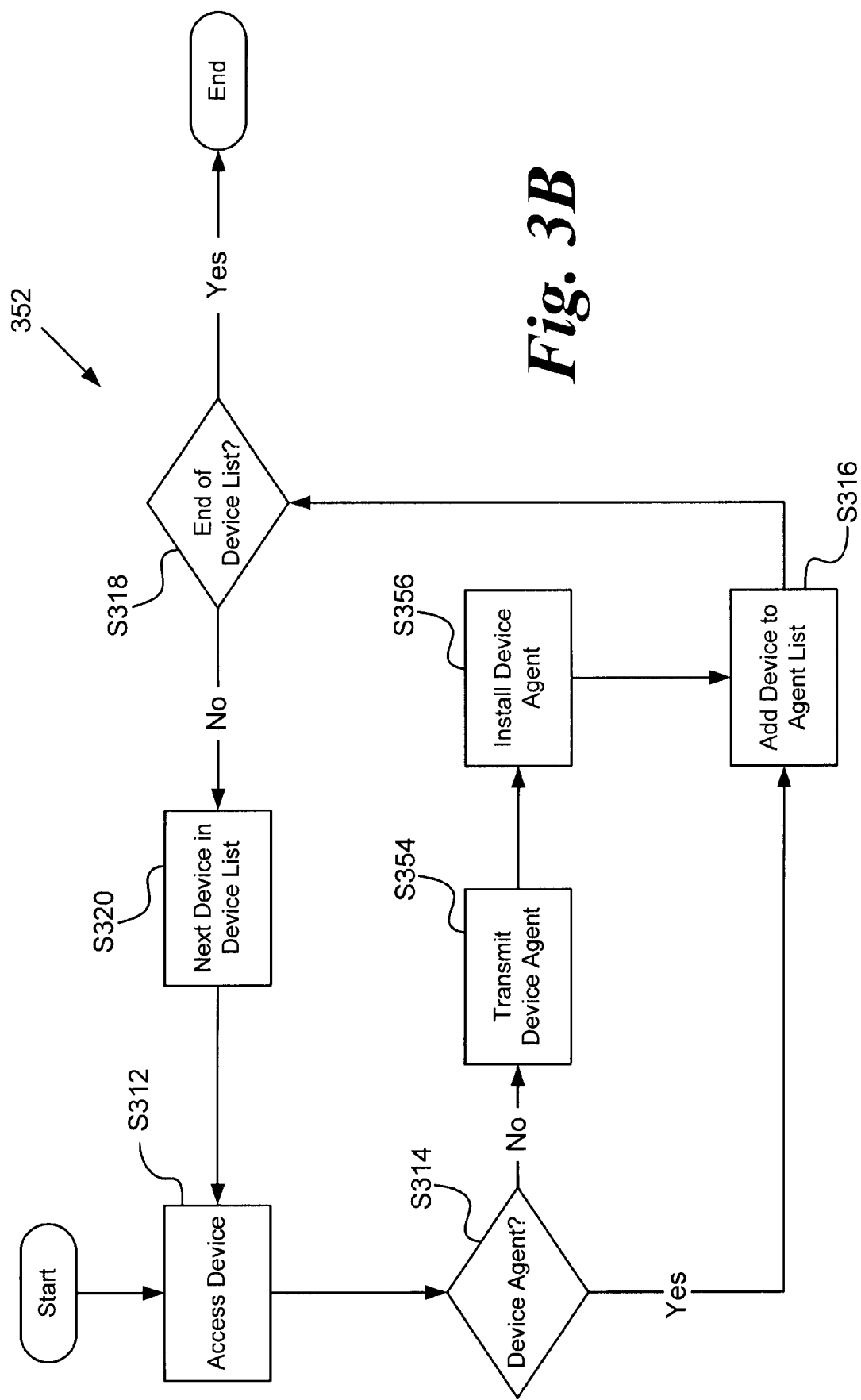
FIG. 3B is an algorithmic flowchart showing an alternative building of the list of devices shown in FIG. 3A.

An alternative to the process block 350 of FIG. 3A is shown in FIG. 3B as a process block 352. The process block 352 shares the same processes S312 through S320 of the process block 350 in FIG. 3A, but adds several steps. In particular, each device of the device list is accessed as in the block process 350 at S312, but when the device agent is not found in the device (NO at S314), the device agent is transmitted to the device at S354. In particular, a device agent is transmitted to the device 300, where the device agent is installed at S356. The device 300 is then added to the agent list at S316. This procedure is repeated by way of S318 and S320, as in process block 350, for each device in the device list.

In a preferred aspect, the device 200 transmits the device agent to the device 300. However, it should be appreciated that the device agent does not necessarily originate from the device 200, and other forms of transmitting the device agents to the device 300 are available. For example, in other employments, the device agent originates from a user device 100 or the device 300 is instructed to access an internet resource for downloading and installing the device agent. Specifically, the device 300 acquires the agent by accessing an internet server to download and install the device agent.

The device agent is a software-based program, which when executed by the device 200 or one of the devices 300 configures the device for distributed printing and/or processing. Without the benefit of the device agent, a standard configuration of the device 200 or the device 300 results in, for example, the device 200 or the device 300 receiving a print job, processing the print job according to instructions received with the print job, and then printing the processed print job. The device agent modifies this standard configuration to allow the device 200 or the device 300 to follow a modified algorithm.

In preferred aspects the device agent configures a device 300 to emulate, through software, the hardware configuration of the device 200 using the hardware of the device 300. That is, when the device 200 and the device 300 are different machine models, the device 300 is configured to emulate the processing of the device 200.

According to one embodiment of this disclosure, divided jobs are transmitted to each of a plurality of devices 300 which are capable of receiving a divided job and performing the appropriate emulation. However, in another embodiment, divided jobs are only transmitted to each of the plurality of devices 300 which is part of a preferred group of devices.

In particular, the devices 300 are divided into several groups, such as a primary group of devices 300 and a secondary group of devices 300. In practice, the primary group of devices 300 are the only devices 300 which are transmitted divided portions, unless the device 200 is notified a primary group device 300 is unavailable. Then, the size of a divided portion sent to the other of the primary group devices 300 is changed accordingly, or a secondary group device 300 is included in the divided portion transmission. In another aspect, the size of a divided portion or a quantity of divided portions sent to a device 300 will depend on a capability of the device 300.

Determining whether a device 300 is a primary or secondary device and determining a capability of the device 300 is preferably performed based on a capability score of the device 300. In one aspect, the score of a device is calculated as a sum of points allocated for various hardware components of the device. Specifically, the points will reflect a processing or storage capacity of the device.

An example device 300 is detailed in FIG. 4A by way of a display window accessible through the device 100 by a user. Here, the device 300 is located at IP 192.168.10.101 and has a CPU speed, memory capacity/speed, and a network interface speed reported. Based on these numbers which reflect the hardware configurations of the device 300, a score can be calculated. Scores can be calculated a number of ways, but in one aspect, the score is a sum of a particular value associated with each hardware component of the device 300. For example, a 1 GHz single-core CPU is worth 300 points, 256 MB of memory at 266 MHz is worth 100 points, and a network interface of 100 Mbits/s is worth 100 points. As a result, the device shown in FIG. 4A has 500 points.

Another example device 300 is detailed in FIG. 4B by way of a display window accessible through the device 100 by a user. Here, the device 300 is located at IP 192.168.10.102 and has a 500 MHz single-core CPU worth 150 points, 512 MB of memory at 266 MHz worth 200 points, and a network interface of 1000 Mbits/s worth 200 points. As a result, the device shown in FIG. 4B has 550 points. In this example the device 300 in FIG. 4B is identified as a primary device 300, whereas the device 300 in FIG. 4A is identified as a secondary device 300.

Also shown in FIGS. 4A and 4B are device idle times and power cost values. These characteristics of the devices 300 can also be used in calculating a score of the devices 300. For instance, the score for the device 300 of FIG. 4B will be lowered, relative to the device 300 of FIG. 4A, proportional to the reported less device idle time and the reported higher power cost for operation. However, it should be appreciated that other characteristics of the devices 300 should be readily envisioned by those skilled in the art, and that methods for calculating the scores should be adaptable for particular installations.

Specifically, as shown in FIGS. 4A and 4B, an option is available for a user to adjust calculations. This option grants a user access to change various factors which affect the calculation of the score for a device 300. In particular, weighting factors for, e.g., CPU speed score calculations or threshold parameters can be defined for calculating a score, which can be altered by way of the Adjust Calculations button shown in FIGS. 4A and 4B.

Concerning threshold parameters, thresholds can be established for removing a device 300 from a score calculation procedure when the cost of operating the device is above a threshold value. For example, when the power cost for operation is above $2.00/kWh, the device 300 does not calculate a score or has a score which is weighted very low. It should be appreciated those skilled in the art can establish threshold values for any of the other device factors discussed above.

Score calculations for the devices 300 are preferably stored by the device 200 so that the device 200 can reference score calculations to determine whether to transmit a divided job to a particular device 300. For example, the device 200 determines whether the particular device 300 is a primary or secondary device 300.

Figure 5A:
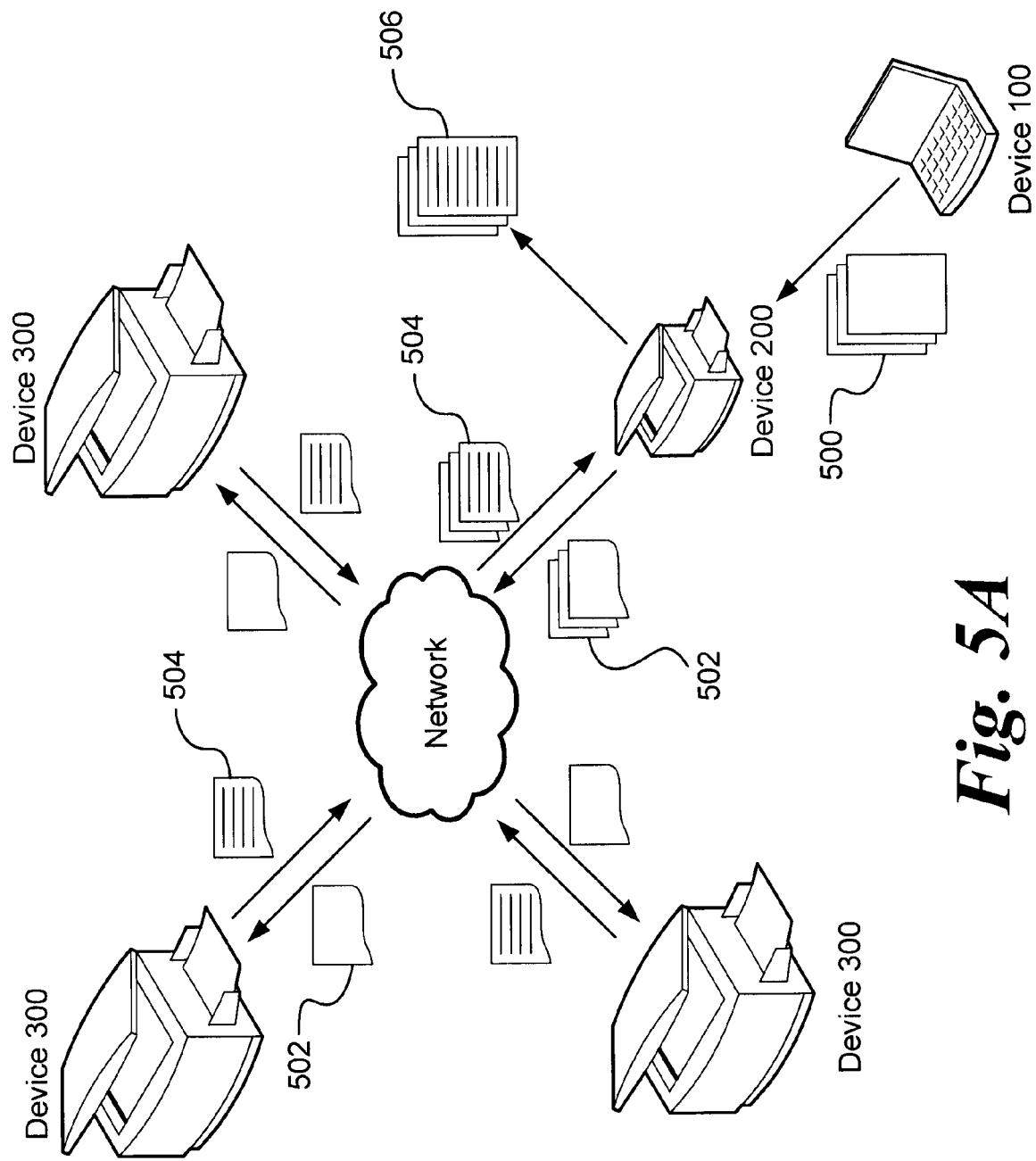
FIGS. 5A and 5B are block diagrams showing distributions of a print job among a plurality of networked devices.
Figure 5B:
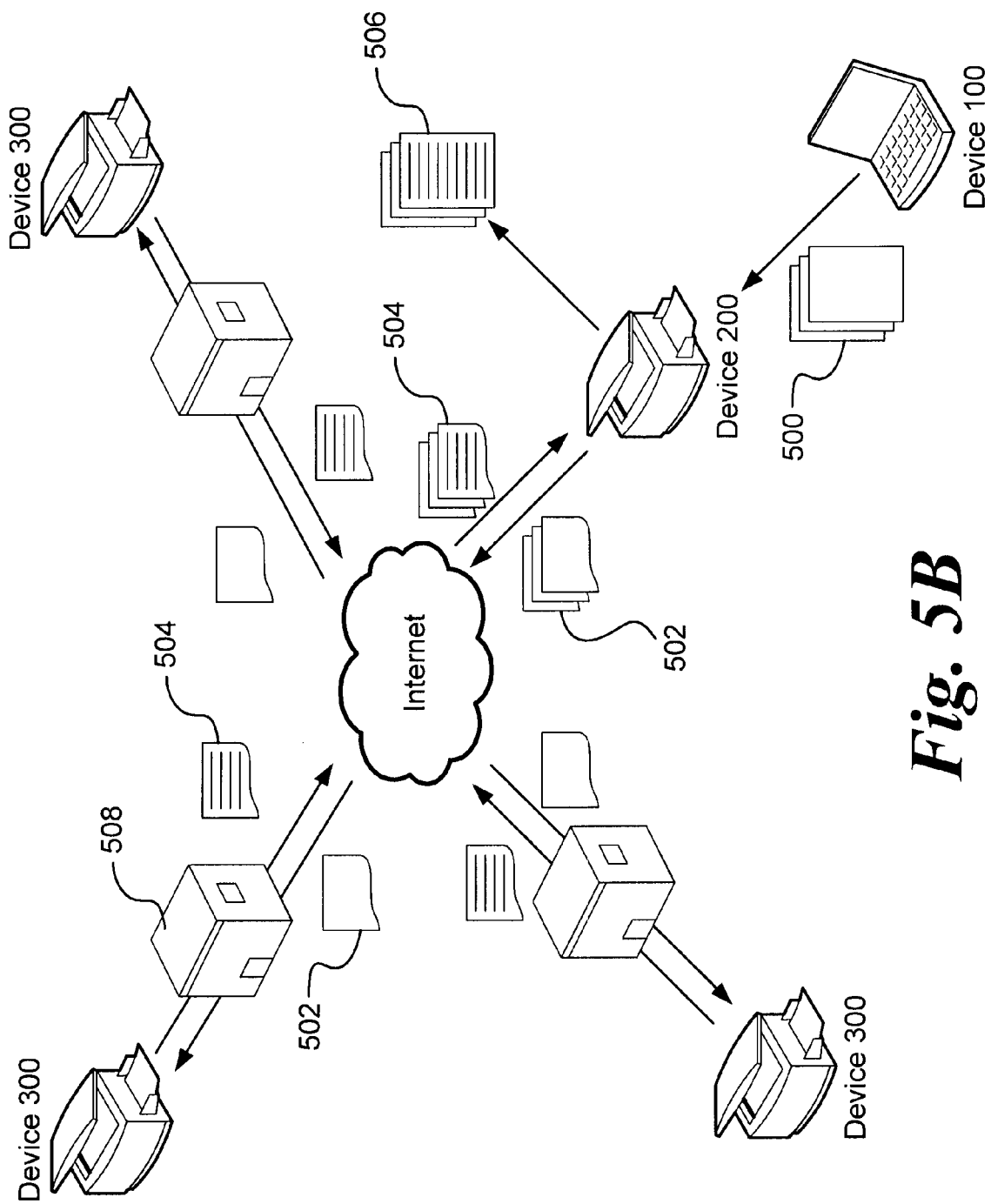

Implementations of the above-discussed aspects of this disclosure will now be described with reference to FIGS. 5-9. In FIGS. 5A and 5B, the device 200 is configured with the above-noted device agent. The device 200 receives a print job request 500 from the user device 100. The device 200 then generates a plurality of divided print jobs 502, each of which are different/unique portions of the print job request 500. These divided print jobs 502 are transmitted, via a network, to a plurality of devices 300.

There are several ways to divide a print job request into portions thereof. One example involves a multi-page document, such as a document in the portable document format (a PDF document), a file format created by Adobe Systems, Mountain View, Calif. However, other documents can be used, such as those formatted in a Microsoft Word ".doc" format, consistent with Microsoft Word 2010, which is developed by Microsoft Corporation, Redmond, Wash.

In this example, each page of the PDF document is extracted from the PDF document as a unique portion thereof. With reference to FIGS. 5A and 5B and a four-page PDF document, each of the divided print jobs 502 shown in FIGS. 5A and 5B includes one of the four pages of the PDF document for processing. Alterations to this example should be readily appreciated, including not using inherent page divisions as defining the divided portions. In particular, with a two-page PDF document, four portions can be made, one for each half of each page of the PDF document.

Further, it is not necessary that divisions based on document page be made. For example, divisions based on content of the pages can be made. Specifically, in another example, a PDF document includes portions of text and portions of images. All or some of the text portions are included in one of the divided print jobs 502, whereas all or some of the image portions are included in another of the divided print jobs 502.

Further examples of dividing a print job request into portions thereof include taking into account the number of devices 300 that are determined to include the device agent. In this example, the device 200 divides the print job request 500 into a number of portions (divided print jobs 502) equal to the number of devices 300 that were determined to include the device agent and are otherwise ready to receive a potion (e.g., are idle, which is discussed in more detail below). In a preferred aspect, the number of pages of the print job are divided by the number of devices 300 to receive divided portions thereof.

It should be appreciated this disclosure is not limited to the above-discussed divisions and other aspects of this disclosure include transmitting more than one divided print job 502 to the same device 300 and divided print jobs 502 of varying size and varying processing requirements. That is, it is not necessary that each of the divided print jobs 502 require the same amount of processing.

Each of the devices 300 shown in FIGS. 5A and 5B also includes the device agent. The devices 300 thus process the respectively received divided print jobs 502 into a plurality of processed divided print jobs 504. These processed jobs 504 are then transmitted, via the network, back to the device 200. Based on instructions from the user device 100, the device 200 receives the plurality of processed divided print jobs 504, and assembles a processed print job 506. This assembled print job 506 is then printed locally at the device 200 or transmitted to another network device for printing, storage, facsimile transmission, etc.

In preferred aspects, the print job request 500 transmitted to the device 200 is of a universal format that is a non-device model dependent format. For example, the print job request 500 is of a PDF (as in the example above), XPS (XML Paper Specification) or HTML (HyperText Markup Language) format.

Further, the divided print jobs 502 preferably include information concerning the device 200. Specifically, the divided print jobs 502 include a model name, accessories and print configuration pertaining to the print job request 500 and the device 200. Such print configurations include duplex printing, black/white printing, color printing and finishing (such as stapling, punching, etc.). As a result of receiving information corresponding to the print job request 500 and the device 200 with the divided print job 502, the device 300 will be notified of a configuration for emulating the device 200 by way of the device agent.

In FIG. 5A, the devices 300 and the device 200 are connected via a common network, such as a printer network group. Such a configuration is in accordance with some aspects of this disclosure.

In other aspects of this disclosure, the devices 300 and the device 200 are connected by the Internet, as shown in FIG. 5B. Here, the divided print jobs 502, the processed divided print jobs 504 are transmitted via the Internet. Further, at least some of the devices 300 can be accessible through different buildings 508 having different network structures, as shown in FIG. 5B. In this aspect, the buildings 508 include gateways or access points to the Internet for the devices 300 to communicate with the device 200.

Figure 6:
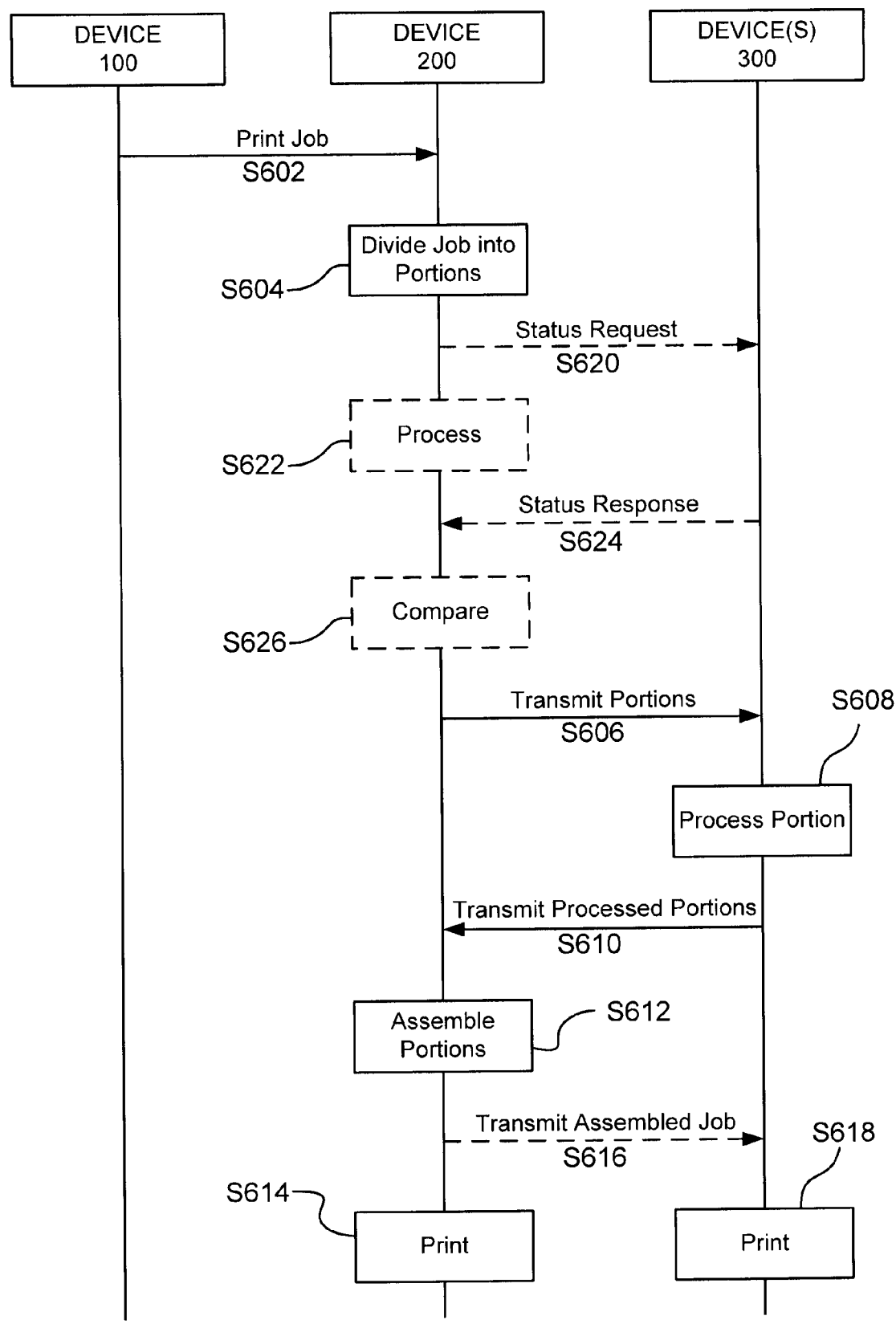
FIG. 6 is an algorithmic state diagram describing an algorithm corresponding to the block diagram shown in FIGS. 5A and 5B.

FIG. 6 illustrates an algorithmic state diagram for aspects of the above-noted process with reference to FIG. 5A or FIG. 5B. The device 100 transmits a print job to the device 200 at S602, and the device 200 divides the print job into a plurality of divisions or portions of the print job at S604. The device 200 then transmits these portions at S606, for example, to the devices 300 identified in an agent list of the device 200 and based on calculated scores for the devices 300, as discussed above. The devices 300 then process the portions at S608, and transmit the processed portions back to the device 200 at S610.

The device 200 assembles the received portions into an assembled print job at S612, and prints the assembled job at S614. Alternatively, the device 200 transmits the assembled job at S616 to another network printer device, such as one of the devices 300, where the assembled job is printed at S618. In a further alteration, not shown, the assembled job is saved in a networked storage unit instead of being printed at S618 or electronically transmitted via a facsimile machine or email device based on initial instructions originating from the device 100.

In further aspects, in order to efficiently use hardware resources on the network, prior to transmitting the divided jobs to the devices 300 at S606, it is beneficial for the device 200 to identify the devices 300 which are idle or otherwise in a standby state. Thus, it is preferred that the device 200 performs a status request and the devices 300 transmit a status responses.

In this aspect, to efficiently use the resources of the device 200 as well as to efficiently use the resources of the devices 300, the device 200 divides the print job into portions at S604, and then transmits a status request to the devices 300 at S620. Contemporaneously, the device 200 starts processing one of or several of the portions divided at S604 while waiting for status responses from the devices 300. That is, there is a delay in time between the status request transmission at S620 and receiving status responses from each of the devices 300 at S624.

Upon receipt of the status responses at S624 by the device 200 at S624, the device 200 performs a comparison at S626. This comparison is to determine whether it is still efficient to transmit the portions divided at S604 to the devices 300. In preferred aspects, this comparison is performed by calculating a percentage of how much processing has been performed at S622 in comparison to a total amount of processing required for the total print job. That is, if there are four divided jobs of equal size and the device has already processed two of the four divided jobs, then a determination is made at the device 200 as to whether to continue to transmit the portions to the devices 300 at S606. For instance, when the device 200 has already completed two out of the four total divided portions, a resulting percentage of 50% is calculated. This percentage is compared to a predetermined threshold value of, for example, 70%. Since the threshold value has not been met, the remaining portions are transmitted at S606. In other words, in this preferred aspect, the portions are transmitted at S606 only when the device 200 has not already processed a predetermined fraction or percentage of the divided portions or the total print job.

The status responses received by the device 200 at S624 also facilitate the device 200 in identifying which of the devices 300 to transmit divided jobs to at S606 based on the status response received at the device 200. Specifically, the device 200 only transmits divided jobs to those devices 300 which respond by indicating an idle status, indicating the respective device is in a hibernating, sleep or otherwise standby mode, within a predetermined amount of time.

In another aspect, the device 200 transmits a wake-up signal to the device 300 to cause the device 300 to return to an operation-ready state from a hibernating or sleep state. Implementations for wake-up signals include Wake-on-LAN (WOL), which is an Ethernet networking standard that allows a networked device to be "woken up" by a network message. If the networked device is connect to the network by Wi-Fi, then Wake-on-Wireless-Lan (WoWLAN) is implemented.

These implementations generally include a configuration and structure of a motherboard or network interface of the hardware of a networked device. Accordingly, the "woken up" features are available even when an operating system of the networked device is not currently active. That is, when the networked device is in a low-power, hibernating or sleep state, the networked device is caused to return to a standard-power, but idle, operation state.

Figure 8:
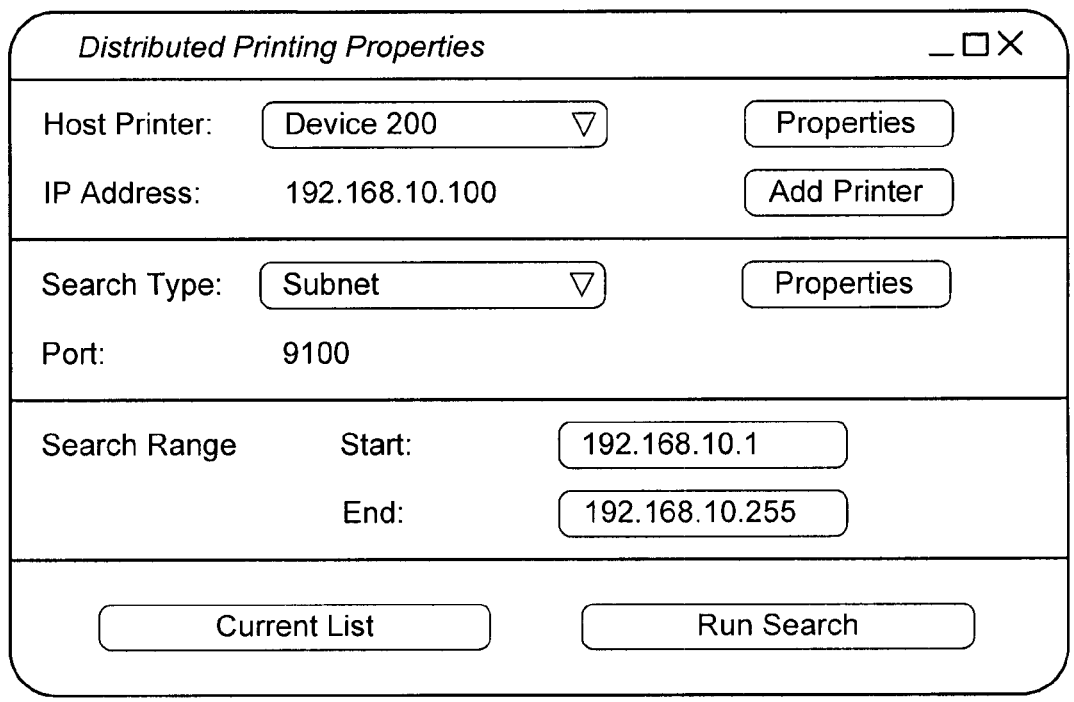
FIG. 8 illustrates a configuration window for configuring a device search for distributed processing/printing.
Figure 9:
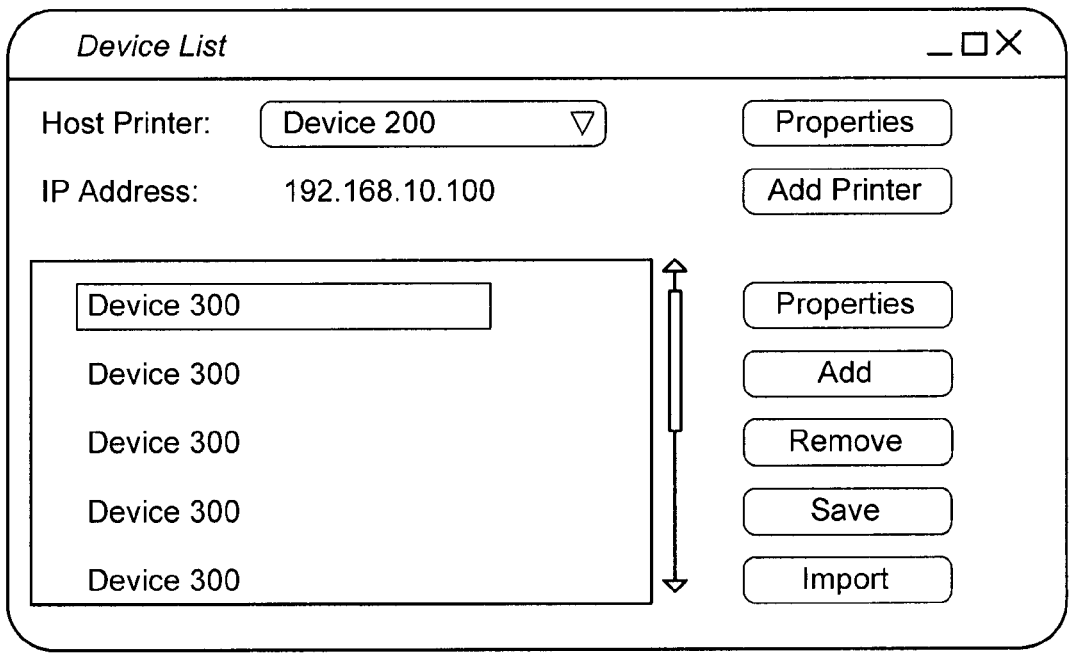
FIG. 9 illustrates a window resulting from either accessing a current agent list or conducting a search corresponding to the device search shown in FIG. 8.

As one skilled in the art will appreciate, various employments of the above-noted algorithms and devices can be made. Such configurations identifying the adaptability of the device agent are shown in FIGS. 7-9.

FIG. 7 illustrates a print window accessible through the user device 100 by a user. The print window provides access for identifying a source device (i.e. device 200) for distributed printing and processing, and specifically for providing the user an interface for transmitting a print job. The print window also offers an interface for adding a new printer to a list of installed printers on the user device 100 and properties thereof.

From the print window, a user can select various printing properties and image processing selections. For example, a user can select a number of pages per sheet to be printed and scaling options. The print window also offers an identification of an output or print destination device. By default, the source device (device 200) is selected as the output printer. However, when a network storage device is alternatively selected, the resulting assembled print job is saved at the network storage device. Corresponding selections can also be made here concerning facsimile machines, email servers, etc.

The window shown in FIG. 7 provides an interface button to access distributed printing properties. These distributed printing properties are shown by way of another window shown in FIG. 8. FIG. 8 shows the device 200 being identified as the host printer together with the IP address of the device 200. The 'host printer' refers to the image processing device which divides the print job and assembles the processed divided print jobs. In other words, the host printer (i.e. the device 200) divides the print job received from the user device 100 into a number of different/unique portions of the print job. Each portion embodies information or data of the print job that does not overlap with another portion.

The window shown in FIG. 8 identifies search information for searching for networked devices which are compatible with distributed processing/printing. Specifically, the search identifies those networked devices which include a device agent. Various search types can be used, but FIG. 8 identifies a subnet-type search as being selected, using TCP port 9100 as a communication port for accessing the devices of the identified subnet.

Based on the above information, a search range can be auto-populated identifying IP addresses 192.168.10.1 through 192.168.10.255, consistent with the previously discussed aspects. However, other search ranges can be inputted by a user to vary the scope of the subnet.

FIG. 8 also shows button interfaces for accessing a current list of devices included in an agent list and for initiating a search in accordance with the criteria shown in FIG. 8. Initiation of either of these button interfaces causes a window consistent with the window shown in FIG. 9 to be displayed.

FIG. 9 illustrates a window including a device list, and specifically an agent list, providing an interface for selecting a host printer (shown here as the device 200 discussed above) together with an IP address of the host printer. In a scroll window below the identification of the host printer is a list of devices 300 which include the agent installed thereon. The procedure for determining the content of this agent list is preferably consistent with the processes shown in FIGS. 3A and 3B.

Any of the devices 300 is selectable for viewing properties thereof, such as IP addresses and device details, and for removing the device 300 from the agent list. Additionally, other devices 300 can be manually added to the agent list by way of the add button shown in FIG. 9. Also, the device list shown in FIG. 9 is exportable by a save command as a backup file, and correspondingly a previously saved agent list is importable through the import command. The import functionality is useful when a plurality of devices 200 share an identical agent list.

FIGS. 7-9 illustrate an interface, such as display screens, for manually initiating and controlling aspects of building an agent list. Although this functionality is preferably provided through the user device 100 by way of a mouse/keyboard and a display screen, at least an initial agent list is preferably built without direct user intervention via the user device 100.

In particular, it is preferable the processes shown in FIGS. 3A and 3B are automatically provided for and initiated in response to connecting a new device 200 or 300 to the network. That is, when a new device is added to a network, the procedure shown in FIG. 3A or 3B is initiated so that each device on the network builds a corresponding agent list. Further, it is preferable the devices 200 and 300 regularly perform device searches to update current device/agent lists to account for newly added or removed devices from the network. For example, the devices 200 and 300 periodically perform device searches to update current device/agent lists once per day/week/month, as selected by a network administrator, to maintain updated lists.

As a result, when instructed to process a print job into a plurality of divided print jobs, the device 200 only needs to transmit idle status requests (with or without wake up signals) to the devices in the agent list to determine which devices are able to receive/process divided print jobs. Consequently, distributed printing/processing is provided without updating an agent list every time a print job is requested by the user device 100.

Furthermore, in the even an updated device agent is available (e.g., from a manufacturer of the device), the connection of a new device 200 or 300 to the network can initiate a comparison between the new device and the existing devices. Specifically, the new device queries the existing devices to determine whether the existing devices have the updated agent installed on the new device. If not, consistent with the block process 352 of FIG. 3B, the existing devices can be transmitted the updated agent. As a result, all compatible devices on the network will obtain the additional functionality of the updated device agent.

Similarly, if an existing device 200 is manually updated though a user device 100 with an updated device agent, then the existing device 200 can be commanded to perform a search through the window shown in FIG. 8. This search will also initiate the block process 352 of FIG. 3B. As a result, even when a network includes a large number of image processing devices, an updated device agent can be installed onto each of the devices with minimal user interaction as a background process on the network.

In an alternative embodiment, adverting back to FIG. 5A or FIG. 5B, instead of dividing a print job request 500 at device 200, the device 200 divides a general computing job into unique general computing portions. These portions are transmitted via the network, like the portions 502, to the various devices 300, where the portions are subjected to processing. The processed portions are then transmitted back to the device 200 for assembling the portions together. A general computing job includes non-print-related and non-image processing related jobs, such as data processing, and also includes aspects of video processing, encoding and decoding. In these aspects, the devices 300 are used for distributed processing in a manner consistent with the above disclosures.

In a particular aspect of this alternative embodiment, the devices 300 are transmitted portions of a general computing job for the SETI@home distributed computing project. SETI@home is a distributed computing project by the University of California, Berkeley, where signal analysis computation (processing) is performed on a portion of data recorded from a radio telescope located in Arecibo, Puerto Rico at the Arecibo Observatory. After processing of the portion is completed, the processed portion is transmitted back to SETI@home servers.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of a first image processing device connected to a network, comprising:
   determining whether a second device of second devices on the network includes an agent compatible with receiving a portion of a print job and transmitting a processed portion of a print job back to the first device;
   in response to determining the second device does not include an agent compatible with receiving a portion of a print job and transmitting a processed portion of a print job back to the first device, transmitting a compatible agent from the first device to the second device so that the second device is to include an agent compatible with receiving a portion of a print job and transmitting a processed portion of a print job back to the first device;
   receiving a print job from a user device;
   dividing the print job into a plurality of portions of the print job;
   transmitting the portions to a plurality of second networked image processing devices to be processed by the second devices;
   receiving the processed portions from the second devices; and
   assembling the processed portions into an assembled print job.

2. The method recited in claim 1, further comprising:
   prior to transmitting the portions of the print job, generating an agent list of the devices among the second devices compatible with receiving a portion of a print job and transmitting a processed portion of a print job back to the first device, the generating including adding the second device, which was transmitted the compatible agent, to the agent list.

3. The method recited in claim 2, further comprising:
   querying the network for second devices;
   building a device list of the second devices;
   querying the second devices listed in the device list;
   determining whether a second device of the device list includes an agent compatible with receiving a portion of a print job and transmitting a processed portion of a print job back to the first device; and
   building the agent list by adding second devices which include the compatible agent and by adding second devices to which the compatible agent has been sent.

4. The method recited in claim 2, wherein the transmitting the portions of the print job includes transmitting the portions only to second devices identified in the agent list.

5. The method recited in claim 1, wherein
each portion of the print job is a different part of the print job that does not overlap with another portion of the print job, and
each portion of the print job requires image processing prior to being able to be printed.

6. The method recited in claim 5, wherein the required processing is rasterizing.

7. The method recited in claim 1, further comprising:
transmitting the assembled print job from the first image processing device to a networked printing device for printing.

8. The method recited in claim 1, further comprising:
printing, at the first device, the assembled print job, wherein the first device includes a printer for performing the printing.

9. The method recited in claim 1, further comprising:
transmitting an idle status request to the second devices requesting an operational status of the second devices; and
transmitting the portions of the print jobs only to those second devices which responded to the status request with an idle status.

10. The method recited in claim 1, wherein the second devices include more than one of printers, copiers, scanners, facsimile machines, network storage devices and multifunction printing apparatuses.

11. The method recited in claim 1, wherein the transmitting the portions to the plurality of second devices includes selecting the second devices according to calculated capability scores for the second devices, each capability score indicating a relative performance level based on a combination of functional hardware, idle time and power consumption cost.

12. A processor-readable storage medium including instructions, that when executed by a processor, cause the processor to perform a method according to claim 1.

13. A first image processing device connected to a network, comprising hardware components, including at least a processor, memory and a network controller, comprising:
means for determining whether a second device of second devices on the network includes an agent compatible with receiving a portion of a print job and transmitting a processed portion of a print job back to the first device;
means for transmitting, in response to determining the second device does not include an agent compatible with receiving a portion of a print job and transmitting a processed portion of a print job back to the first device, a compatible agent from the first device to the second device so that the second device is to include an agent compatible with receiving a portion of a print job and transmitting a processed portion of a print job back to the first device;
means for receiving a print job from a user device;
means for dividing the print job into a plurality of portions of the print job;
means for transmitting the portions to a plurality of second networked image processing devices to be processed by the second devices;
means for receiving the processed portions from the second devices; and
means for assembling the processed portions into an assembled print job.

14. A method of a second image processing device connected to a first image processing device through a network, comprising:
receiving a query from the first device, the query inquiring as to whether the second device is compatible with receiving a portion of a print job and transmitting a processed portion of a print job back to the first device;
when the query is transmitted to the second device and (1) the second device transmits a compatibility acknowledgement back to the first device that the second device is not compatible or (2) the second device does not transmit a compatibility acknowledgement within a predetermined amount of time, receiving an agent compatible with receiving a portion of a print job and transmitting a processed portion of a print job back to the first device;
transmitting a compatibility acknowledgement to the first device that the second device includes the agent;
receiving a portion a print job from the first device;
processing the portion; and
transmitting the processed portion back to the first device.

15. The method recited in claim 14, further comprising:
installing the agent, wherein the transmitting the compatibility acknowledgement back to the first device includes transmitting an indication that the agent is installed in the second device.

16. The method recited in claim 14, further comprising:
receiving an idle status request at the second device requesting an operational status of the second device; and
transmitting, to the first device, an idle status as the operational status of the second device.

17. The method recited in claim 16, wherein the second device receives the division only when the second device is in idle status.

18. A processor-readable storage medium including instructions, that when executed by a processor, cause the processor to perform the method according to claim 14.

* * * * *